(12) United States Patent
Tucker (10) Patent No.: US 8,027,446 B2
(45) Date of Patent: Sep. 27, 2011

(54) SYSTEM AND METHOD FOR PROVIDING SERVICE MEDIATION AND ORCHESTRATION FOR EXTERNAL TELEPHONY APPLICATIONS

(75) Inventor: Douglas Tucker, Foster City, CA (US)

(73) Assignee: Ubiquity Software Corporation Limited, Cardiff (GB)

( * ) Notice: Subject to any disclaimer, the term of this patent is extended or adjusted under 35 U.S.C. 154(b) by 1283 days.

(21) Appl. No.: 11/626,093

(22) Filed: Jan. 23, 2007

(65) Prior Publication Data

US 2008/0175357 A1    Jul. 24, 2008

(51) Int. Cl.
*H04M 3/42* (2006.01)

(52) U.S. Cl. .............. 379/201.03; 379/201.12; 370/259; 709/246

(58) Field of Classification Search .............. 379/201.12, 379/211.02, 201.03; 370/259; 709/246
See application file for complete search history.

(56) References Cited

U.S. PATENT DOCUMENTS

| | | | |
|---|---|---|---|
| 6,735,294 B2 * | 5/2004 | Creamer et al. | 379/211.02 |
| 2007/0041528 A1 * | 2/2007 | Menon et al. | 379/90.01 |
| 2010/0211701 A1 * | 8/2010 | Townsend | 710/16 |

* cited by examiner

*Primary Examiner* — Creighton Smith

(57) ABSTRACT

A system for providing service mediation comprising a service enablement platform between a service network and a telephony application external to the service enablement platform, the service enablement platform comprising an adaptor providing an interface between the external telephony application and the service enablement platform, the adaptor exposing functionality of the external telephony application to one or more functional units of the service enablement platform.

22 Claims, 5 Drawing Sheets

SYSTEM AND METHOD FOR PROVIDING SERVICE MEDIATION AND ORCHESTRATION FOR EXTERNAL TELEPHONY APPLICATIONS

CROSS-REFERENCE TO RELATED APPLICATIONS

The present application is related to copending and commonly-assigned U.S. patent application Ser. No. 11/477,314, filed Dec. 7, 2006, entitled "SYSTEMS AND METHODS FOR CONNECTING HETEROGENOUS NETWORKS," now issued as U.S. Pat. No. 7,873,034 and to copending and commonly-assigned U.S. patent application Ser. No. 11/648,400, filed Jun. 29, 2006, entitled "SYSTEM AND METHODS FOR PROVIDING FEATURE MEDIATION AND ORCHESTRATION ON INTERNET PROTOCOL SERVICE NETWORKS," the disclosures of which are hereby incorporated by reference.

TECHNICAL FIELD

This description relates generally to the provision of telephony services in communication networks and, more specifically, to bridging users with a variety of telephony services.

BACKGROUND OF THE INVENTION

Traditionally, telephony applications have been built within isolated, vertical platforms—i.e., self-contained boxes, each performing a fixed set of functions. Vertical applications are generally external to a service provider's (e.g., cellular network operator's) platform.

Typically, each vertical application identifies and hosts a single telephony service function. An example of such a function is a Class 5 feature server, which is typically used to provide basic dialing functionality to the cell phone subscribers of the network. A Class 5 feature server is usually embodied in a single vertical application. Another example of a stand-alone, external application is a voice mail server. Each service provider's platform can be serviced by a plurality of vertical applications, each defining an isolated service for the telephone network. Such applications are usually specifically designed by each particular vendor, hence providing little opportunity for enhancements and addition of functions. Generally, custom modifications to traditional telephony applications required a substantial financial investment, as well as time to implement, test, and deploy. Therefore, technological and market developments could not be easily accommodated.

More recently, however, service providers have recognized that differentiated services drive markets more so than price competition models. Accordingly, they have offered groups of services, sometimes closely bundled, in order to attract new subscribers. Unfortunately, as mentioned above, traditional telephony applications do not typically provide custom functions, and do not lend themselves to integration. Attempts have been made in the past to provide open application environments that facilitate the development of new applications for providing custom services. However, such open application environments frequently require that service providers write their custom applications entirely. This has proven to require more investment than the service provider could justify.

One current attempt to mitigate the shortcomings is a system called a Service Capability Interaction Manager (SCIM), and it is defined through the IP Multimedia Subsystem (IMS) consortium effort. SCIM systems include a layer between the underlying Internet Protocol (IP) service network and the vertical applications, and that layer provides for multiplexing the subscriber session among multiple vertical applications. A problem with this solution is that it is very bottom-up because it arises from a network-centric view of telephony. A typical SCIM system uses only the underlying IP mechanisms to make decisions regarding steering the subscriber among the vertical applications hosted by the service provider's platform. It is usually a very rigid way of predicting what the subscriber is going to do. In other words, SCIM does not provide a way to define a new service operation; rather, it inserts an additional piece of intelligence between a subscriber and the vertical applications to steer the subscriber to services based on its signaling.

Another recent trend is to move away from individual vertical applications and go to a more open and top-down way of defining applications through a Service Oriented Architecture (SOA). Instead of being underneath at the network layer discovering what a subscriber is accessing, an SOA system sequences a subscriber through a pre-described set of operations across multiple vertical applications. SCIM systems typically do not fit within an SOA framework.

BRIEF SUMMARY OF THE INVENTION

Various embodiments of the present invention are directed to systems, methods, and computer program products that include at least one adaptor between the external applications and the underlying communication network. In effect, the adaptor bridges the functionality of the external applications to the service provider's platform. An example of bridging the functionality is to expose functionality as a web service (typically XML over HTTP) to one or more functional units in the service provider's platform. Once the functionality is exposed a developer can use top-down and even industry standard techniques to extend, modify, and replace functionality of any of the external vertical applications. Thus, in one example, if a service provider is serviced by a vertical application and does not desire to recreate a custom application from scratch, the service provider can effectively bring the bulk of the functionality of the external application into an SOA architecture framework and then selectively add/replace/modify the functionality thereof by, e.g., using service layer orchestration.

One potential benefit of such a system is that it can give control to a service provider to add functionality, whereas in traditional systems, most of that control was with vendors of external applications. Further, various embodiments of the invention provide an interface to the functionality that is based on a high-level scripting language that generally takes a lesser degree of skill to affect changes to the operation of a system. In other words, a service provider may be able to leverage vertical applications that have a significant degree of complexity into an environment that makes it simpler and more efficient to add/modify/replace functionality, often at a reduced expense. Another possible benefit of some embodiments is that they can be linked with subscriber policy applications so that the adding/modifying/replacing can be performed according to policies and subscriber profile management platforms within the service provider network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
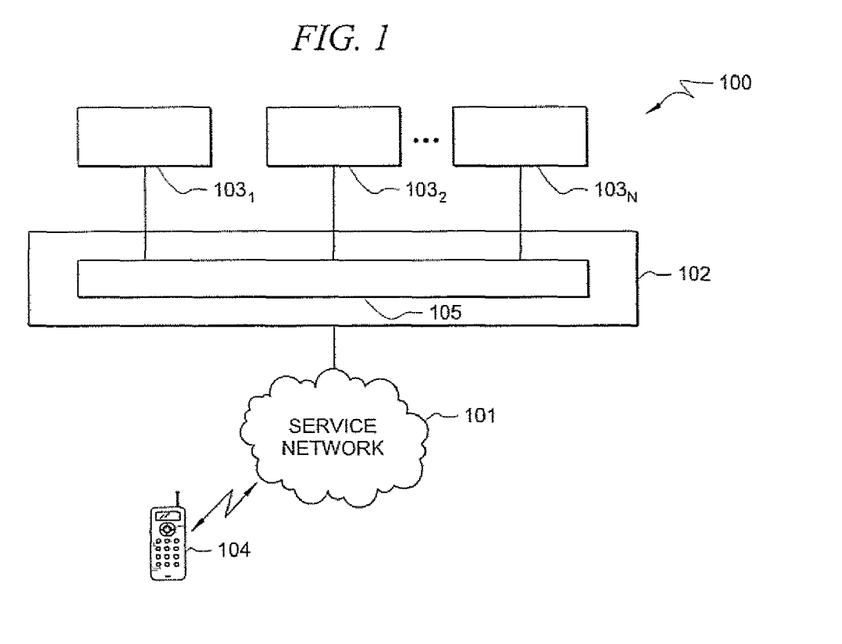
FIG. 1 is an illustration of an exemplary system adapted according to one embodiment of the invention.

FIG. 1 is an illustration of system 100 adapted according to one embodiment of the invention. System 100 includes service network 101 that can be any of a variety of networks providing communication to users. An example includes a cellular telephone network wherein much of the underlying communication is performed via Internet Protocol (IP); however, the invention is not limited thereto, as network 101 may additionally or alternatively include one or more networks that provide packet switched and/or circuit switched services to users. System 100 can be used in some embodiments to provide a bridge between user 104 and external telephony services applications 103 (also known as "vertical applications").

External telephony service applications 103 provide services to network 101. Examples of services include, e.g., dialing, voice mail, call waiting, call forwarding, Follow Me/Find Me, and the like. Service enablement platform 102 sits between network 101 and applications 103 and provides services to user/subscriber 104. In some embodiments, service enablement platform 102 includes a Session Initiation Platform (SIP) application server. Additionally, service enablement platform 102 includes adaptor 105 that provides a common interface between applications 103 and service enablement platform 102. Service enablement platform 102 in some embodiments allows for quick deployment of new services/features from the applications (logical or otherwise) to network 101, as explained further below. Additionally, service enablement platform 102 in some embodiments facilitates integration of a variety of features from external sources (e.g., applications 103) to user 104 via network 101.

Figure 2:
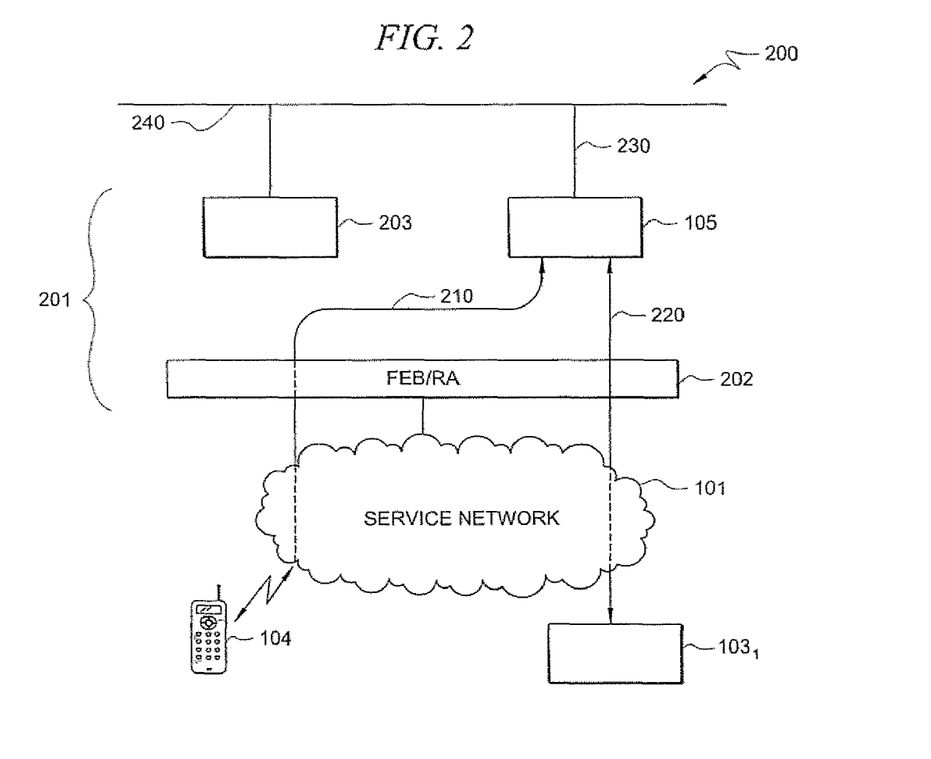
FIG. 2 is an illustration of an exemplary system adapted according to one embodiment of the invention.

FIG. 2 is an illustration of system 200 adapted according to one embodiment of the invention. In fact, FIGS. 2-4 and 6 are conceptual illustrations, each focusing on different aspects and/or structures in various embodiments. Generally, the features shown in FIGS. 2-4 and 6 are not mutually exclusive.

System 200 is an example implementation of a system according to the principles of system 100 (FIG. 1) with more details shown. For instance, Service Oriented Object Framework (SOOF) environment 201 is an environment that runs on service enablement platform 102 as described herein. SOOF environment 201, in this example, includes three object layers (two of which are shown in FIG. 2) that a developer can utilize to provide extended functionality to user 104.

One such layer is Foundation Element Block (FEB) Resource Adaptor (RA) objects layer 202 which handles external communications protocols for SOOF environment 201. Above layer 202 is an Service Logic Block (SLB) layer that includes custom application environment 203 and adaptor 105, also referred to as a "Service Bridge Adaptor" (SBA). Custom application environment 203 may allow developers and programmers associated with service network 101 to customize network 101 with a limited number of additional telephony features, similar to those offered by applications 103. There are at least two differences between custom application environment 203 and external applications 103 in this example. First, services offered by custom application environment 203 are usually small features meant to supplement a more robust service offered by one or more external applications 103. Second, custom application environment 203 is internal to service enablement platform 102, whereas applications 103 are external to service enablement platform 102. The SLB layer provides much of the functionality discussed further herein. Above the SLB layer is a Business Logic Block (BLB) layer (not show but discussed in more detail with regard to FIGS. 3 and 4), which is an orchestration layer that is operable to combine multiple service features into one or more logical services.

FIG. 2 illustrates SBA 105 bridging the functionality of application 103 into SOOF environment 201 as a service. In this example, SBA 105 is a computer program that understands how to communicate with application 103 and control its functions, for example, by providing triggers for application 103. SBA can, in one aspect, be a transparent bridge between user 104 and application 103.

In this embodiment, SBA 105 has three main connections 210, 220, and 230. Connections 210, 220, and 230 can be through network 101 and/or through any other network, such as a Local Area Network (LAN), a Wide Area Network (WAN), and the Internet. Connection 210 is from user 104 to SBA 105 through FEB layer 202. Connection 220 is from SBA 105 to external application 103. Connections 210 and 220 provide access from user 104 to external application 103. Connections 210 and 220 allow SOOF environment 210 to pass user 104 transparently through to application 103 and pass functions of application 103 back to user 104. Connection 230 is shown at the top of SBA 105, and it is operable to expose select operations of application 103 as a web services interface on services bus 240 or may be used by a BLB within platform 102 to combine exposed functionality from SBA 105 and environment 203 into a unified logical application. An example of a functional unit that can use the web services interface for accessing such services includes an orchestration layer, custom application environment 203, and the like. For example, an orchestration function may receive the exposed operations and use that functionality and combine it with one or more logical services to create new logical telephony applications. Connection 230 (as well as connections 210 and 220) is two-way, allowing another functional unit (such as an orchestration layer) to do external triggers or controls of functions within application 103. In this example, SBA 105 defines the services that are accessible and controllable to outside units through interface 230.

One difference between system 200 and traditional systems is that SBA 105 is independent of other functionalities within SOOF environment 201, and can be supplied to a service provider by a developer of external applications. In the example of system 200, SBA 105 acts as a services driver, and an operator of platform 102 (FIG. 1) can purchase the driver from a third party application vendor to access some or all of the functionality of the external application 103. An advantage of some embodiments is that SBA 105 provides a way of exposing application functionality so that the functionality is more easily modified by operators of provider platform 102. In this example, there are at least three groups of users who benefit from SBA 105. First, the network operator receives more access and more flexibility of services through having SBA 105 in platform 102. Second, a third party vendor can extend the life of its product (applications 103) and better support and roll out new functionalities sooner to meet demanding service provider schedules. Third, developers (both independent and otherwise) are free to add new and innovative features and unctions around applications 103.

Figure 3:
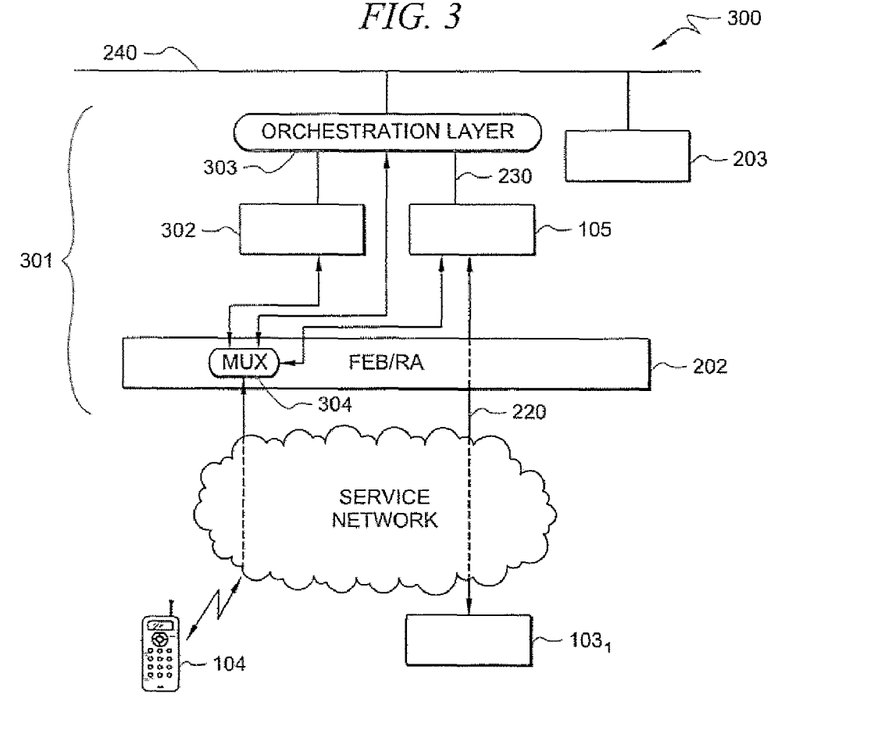
FIG. 3 is an illustration of an exemplary system adapted according to one embodiment of the invention.

FIG. 3 is an illustration of system 300 adapted according to one embodiment of the invention. FIG. 3 illustrates one way in which SBA 105 can superimpose functionality from third party vertical application 103 into SOOF environment 301. In system 300, vertical application platform 103 is connected to SBA 105 and orchestration object layer 303 is between SBA 105 and service bus 240. FEB layer 202 provides a central access point to the session of user 104. In one example, external application 103 acts as a Class 5 feature server, and a service provider desires to add a new call forwarding feature to the services already provided thereby. The new feature can be provided, e.g., by developing it in a custom application environment and adding it as Service Object 302. Orchestration layer 303 receives the interface of the new feature from SBA 105 and effectively controls session multiplex 304 to switch user 104 from application 103 to the logical application that is defined by layer 303. Then, based on a trigger through interface 230, orchestration object layer 303 makes a determination to move the user session to new feature 302 so that the new Call Forward function can be executed, thereby replacing and/or adding to functionality in application 103. After new feature 302 is provided, orchestration layer 303 may, if appropriate, move the user session back to application 103.

An advantage of some embodiments is that new services can be added without an extended development cycle for application 103, itself as in some prior art systems. In this example, call forwarding is a small percentage of the overall functionality of application 103, but it generally has a significant revenue impact to the service provider. Using SBA 105, the cost of implementing a new feature is generally small, and the development may take only a month or two. Thus, the addition of a new feature takes weeks instead of months.

Figure 4:
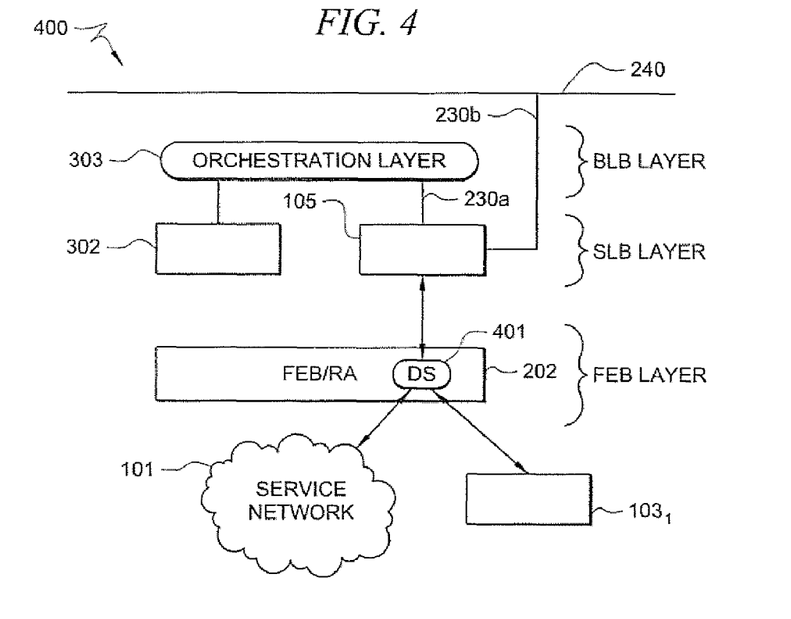
FIG. 4 is an illustration of an exemplary system adapted according to one embodiment of the invention.

FIG. 4 is an illustration of system 400 adapted according to one embodiment of the invention. Specifically, FIG. 4 focuses on the operation of dialog services unit 401, which is an object in FEB object layer 202 that provides the multiplex operation described in the previous example to SBA 105 from application 103 and network 101. Dialog services unit 401 stores and executes the protocols (e.g., SIP) and rules to engage with networks and/or vertical application platforms outside of SOOF environment 201 and exposes those networks and/or vertical application platforms to network 101. In other words, dialog services unit 401 provides SBA 105 with access to application 103 and network 101 and any subscribers thereto. In system 400, interface 230 connects to orchestration BLB layer. As in FIG. 3, SBA 105 can use interface 230a to blend services of application 103 with other services. Additionally, SBA 105 can use interface 230b to export services outside of SOOF platform 201 onto web services logical service bus 240 so that the service can be orchestrated into a higher layer (not shown) of the overall application infrastructure.

FIG. 4 also illustrates the three object layers mentioned above. As shown, the FEB layer is below the SLB layer, which is below the BLB layer. The BLB layer provides the orchestration functionality and is responsible for combining the functions from different applications into a logical application. It also provides the application context and can provide an interface for external control of any of the applications.

Figure 5:
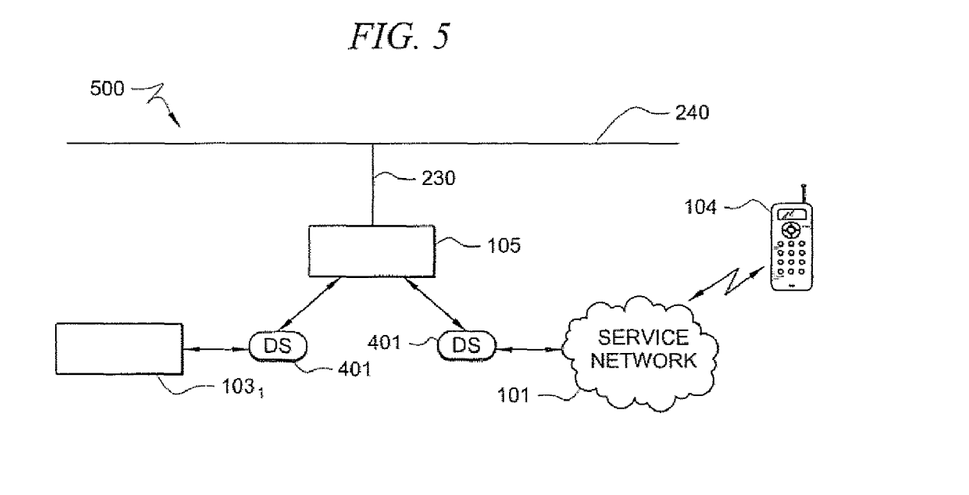
FIG. 5 is an illustration of an exemplary conceptual flow adapted according to one embodiment of the invention, showing a functional view of the control flow that happens through the system of FIG. 4.

FIG. 5 is an illustration of conceptual flow 500 adapted according to one embodiment of the invention, showing a functional view of the control flow that happens through system 400 (FIG. 4). From left to right, application 103 goes through dialog services unit 401, which provides an application-centric function to understand the procedures necessary to talk to application 103. In this example, SBA 105 has code therein written specifically for application 103 that can utilize those application-centric functions and triggers and make decisions about when to expose application services to services bus 240 (or to another functional unit, such as orchestration layer 303 of FIG. 3) and when to pass the services to service network 101 (FIG. 1). The control flow then goes to dialog service 401, which applies network-centric functions that know how to interact with the underlying services network (service network 101) and attach to and communicate with user 104. There is also a corresponding right to left flow as well where application interactions from user 104 come through the network-centric dialog functions into SBA 105. SBA 105 uses intelligence therein to determine whether to expose user 104 actions to services bus 240, an orchestration layer, or application 103. Note that dialog services unit 401 is depicted twice in flow 500. This is because dialog services unit 401 is used twice in each directional flow-once application-centric and once network centric. In some embodiments, dialog services unit 401 may be a single object, and in other embodiments, it may be multiple objects.

The FIGURES above show that the combination of dialog services unit 401 and SBA 105 provides a high level back-to-back user agent that allows a SOOF environment to tap the functionality of one or more applications and selectively interrupt control flow 500 and insert new functionality into control flow 500. Some embodiments can be created such that SBA 105 does not require any underlying SIP functionality or functionality for other network protocols that are used between application 103 and dialog services unit 401 and between dialog services unit 401 and service network 101. Such SBA 105 can be focused on the high-level definition of application 103 functionality that is exposed or inserted into control flow 500. The actual communication protocols can be handled by dialog services unit 401. A benefit of such an embodiment is that it makes the definition of SBA 105 well contained, well understood, and simple to develop. However, it should be understood that the invention is not so limited, as one or more other embodiments may include network communication protocol functionality in SBA 105.

Figure 6:
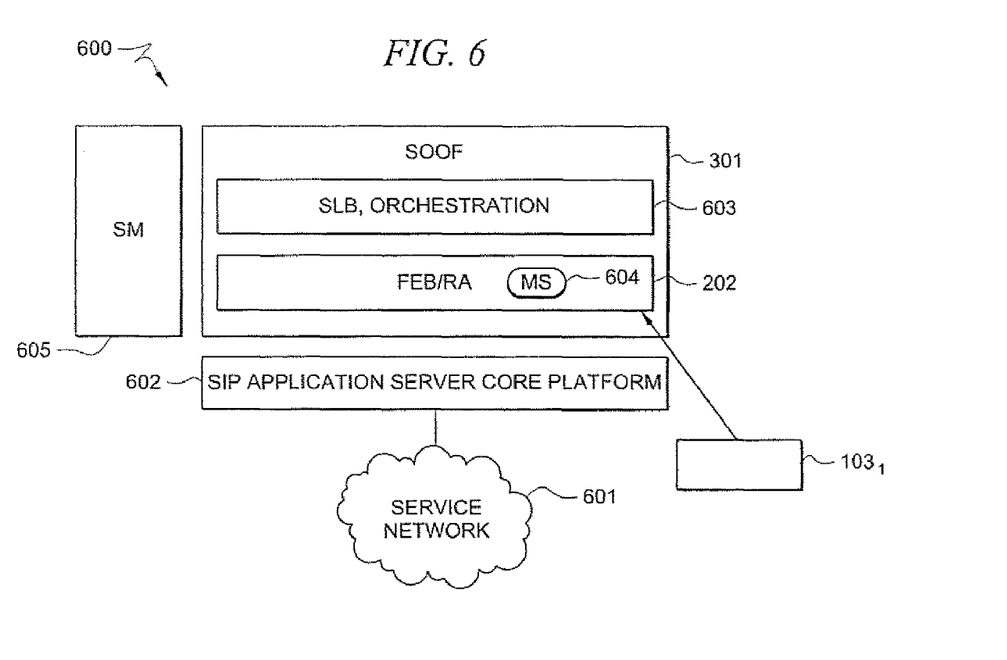
FIG. 6 is an illustration of an exemplary system adapted according to one embodiment of the invention.

FIG. 6 is an illustration of system 600 adapted according to one embodiment of the invention. In system 600 the base platform is SIP application server core platform 602 connected to service network 601 and application 103. Service Mediation (SM) 605 is a database and functional unit that keeps track of policies, subscriber information, and the like and performs policy enforcement, security functions, and subscriber database abstraction and normalization.

A possible benefit of some embodiments is that hey can be linked with subscriber policy applications so that the adding/modifying/replacing can be performed according to policies and subscriber profile management platforms within the service provider network. Thus, functionality can be provided from external applications based on the subscriber provisioning and subscriber preferences. Further, various embodiments can unify access and policy management of application resources through a single container, whereas today it is performed according to each vertical application vendor. This may eliminate a significant overhead on the network operator to maintain and update individual services.

As SOOF infrastructure 301 is added to SIP application server core platform 602, the service provider gains the use of FEB layer 202, which can be described as a driver layer that provides a focal point for insulating interactions with external devices and service networks outside of SIP application server core platform 602. An example of such a configuration is a dialog services FEB that includes functionality to perform the basic operations that are supported by and defined by the underlying IP service network. Such operations may include connecting two subscribers, connecting multiple subscribers together into a session, transferring calls, and the like. The example dialog services function also contains media server 604, which is one or more application resource drivers that can interact with a given vendor's application resources (such as the resources of application 103). Currently, there are multiple vendors that provide media servers, and each one typically has a different control interface and a different way of allocating resources within a set of policies and rules. In some embodiments of the present invention, functionality for a number of vendors can be included into a single FEB so that it is not an issue when implementing a new application.

The insulating nature of FEB layer 202 may allow application developers to create services that are focused on the desired function rather than the underlining protocols of service network 601. One benefit that may apply to such an embodiment is that it can give the network operator control of their underlying service network and selection of vendors for application resources, since it may obviate any need to modify existing applications as other applications are changed or added or as other IP service networks are changed or added. Thus, an application developer may be able to develop applications or services independently of any one network operator.

Then, as each network operator evolves their respective networks at different paces and for different reasons, the application developers can target applications for multiple network operators, adding cost effectiveness. Such a move may open a market of readily-available applications that can be bought off-the-shelf.

Further, as network operators change application resources (e.g., changing media servers), the operators may not have to change any of the applications that are currently available to the service network. Instead, a network operator can replace the application resource and replace the FEB dialog services unit that is associated with the resource, and the services then make use of the new application resource without modification.

A potential benefit of some embodiments is that they can give control to a service provider to add functionality, whereas in traditional systems, most of that control was with vendors of external applications. For instance, in traditional systems, the vertical application vendor has a large code base and a large team of developers necessary to maintain the code base. Vertical applications are typically written in C, C++, or JAVA™, and a programmer generally needs some expertise to modify or even understand how an application operates. Various embodiments of the invention provide an interface to he functionality that is based on a high-level scripting language, such as Business Process Execution Language (BPEL), that generally takes a lesser degree of skill to affect changes to the operation of a system. Thus, it may be possible for a service provider to build a small set of functionality from scratch and use a high-level scripting language to blend it with functionality from vertical applications. In other words, a service provider may be able to leverage vertical applications that have a significant degree of complexity into an environment that makes it simpler and more efficient to add or modify or replace functionality, often at a reduced expense.

Figure 7:
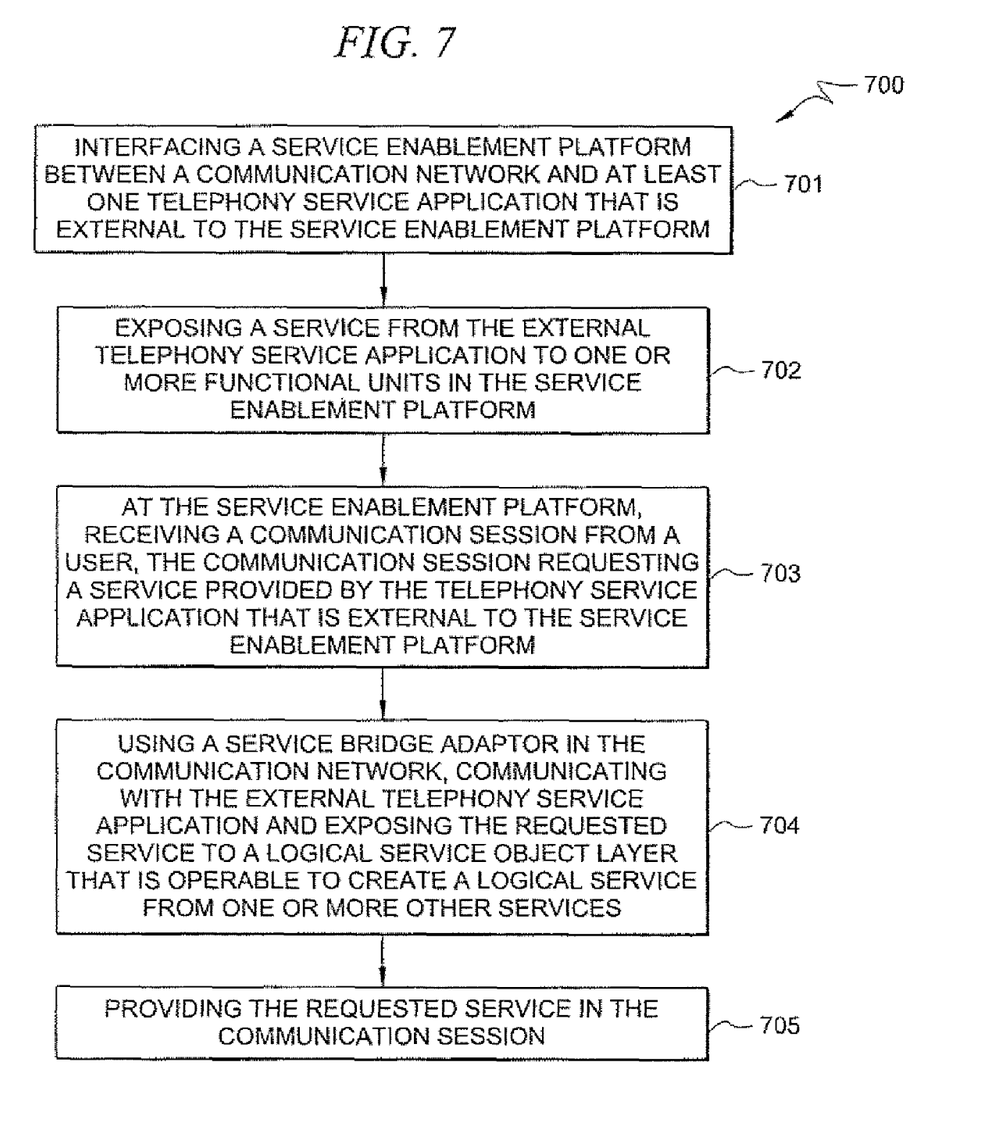
FIG. 7 is an illustration of an exemplary method adapted according to one embodiment of the invention.

FIG. 7 is an illustration of method 700 adapted according to one embodiment of the invention. Method 700 in this example provides a way to bridge users and services in, e.g., a cellular network environment. Method 700 may be performed by any of a variety of processor-based devices. For example, a server-type computer that is operable to run a SIP application server platform program may perform method 700 as it executes instructions in one or more computer programs. Further, distributed processing can be used such that various functionality can be provided by one or more computers.

In step 701, a service enablement platform is interfaced between a communication network and at least one telephony service application that is external to the service enablement platform. In one example, the service enablement platform initializes programs used to communicate with the telephony services application and the communication network. Such programs can be dialog services units in an FEB layer of a SOOF environment, as shown above in FIG. 4. Thus, the service enablement platform is operable to communicate with the communication network (and objects therein) and also with external, third-party applications.

In step 702, a service from the external telephony service application is exposed to one or more functional units in the service enablement platform. In one example, an adaptor, such as SBA 105 (FIG. 1) exposes the service as a web service by outputting it in Extensible Markup Language (XML) running over Hypertext Transport Protocol (HTTP). Additionally or alternatively, the service can be exposed as a Remote Method Invocation (RMI), a Simple Object Access Protocol (SOAP) communication, Transmission Control Protocol/Internet Protocol (TCP/IP) socket with custom payload, or other technique now known or later developed.

SBA 105 can expose the service to a logical service unit that orchestrates services from a variety of applications, a services bus, any other functional unit in the service enablement platform, and/or the like. Additionally or alternatively, step 702 can include exposing the service to a functional unit outside of the service enablement platform, such as a functional unit on the Internet or other network. In step 702, the service is provided in a way that makes it more accessible than it would otherwise be in a system of the prior art wherein the third-party application has a custom/proprietary interface.

In step 703, at the service enablement platform, a communication session is received from a user, the communication session requesting a service provided by the telephony service application that is external to the service enablement platform. In one example, the communication session is a cellular telephone call from a user on the communication network. In such an example a variety of services may be requested, including (but not limited to) connecting the call to another user, call waiting, call forwarding, and the like.

In step 704, using a service bridge adaptor in the communication network, the platform communicates with the extended telephony service application and exposes the requested service to a logical services object layer that is operable to create a logic service from on or more other services. Thus, the service bridge adaptor connects the logical services object layer to the external application by providing the logical service object layer with an interface to the application that it can understand. In one example, the interface is a web services interface. The logical services object layer can then create a logical service application from the exposed service. An example of a logical services functional unit is the orchestration functional unit described in U.S. patent application Ser. No. 11/648,400, filed Jun. 29, 2006, entitled "SYSTEM AND METHODS FOR PROVIDING FEATURE MEDIATION AND ORCHESTRATION ON INTERNET PROTOCOL SERVICE NETWORKS,"

In step 705, the requested service is provided in the communication session. In one example, the service is provided as a logical service to the user. Various embodiments of the invention provide the service in a transparent and smooth manner such that the user is unaware of the operations in the platform to provide the service.

While method 700 is shown as a serial process with a finite number of steps, various embodiments of the invention are not so limited. Specifically, other embodiments may add steps, rearrange steps, omit steps, and the like. In one example, various steps are repeated multiple times during the same call and for other calls, as well, with step 701 being performed less frequently than other steps. In another example, the service is provided to the user from the external application rather than as a logical service, such that the logical services object layer is not used in step 704. Any of a variety of modifications can be made to method 700.

Further, white various embodiments are shown herein as existing in SIP-based systems, the invention is not so limited. For example, principles of the embodiments shown above are applicable to systems that use H.323 protocol. Various embodiments of the invention can be adapted for use with many communication networks now known or later developed, such as cellular and Personal Cellular Service (PCS) networks, land-based networks, satellite-based networks, Voice Over IP (VoIP) networks, IMS networks, and the like.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 8:
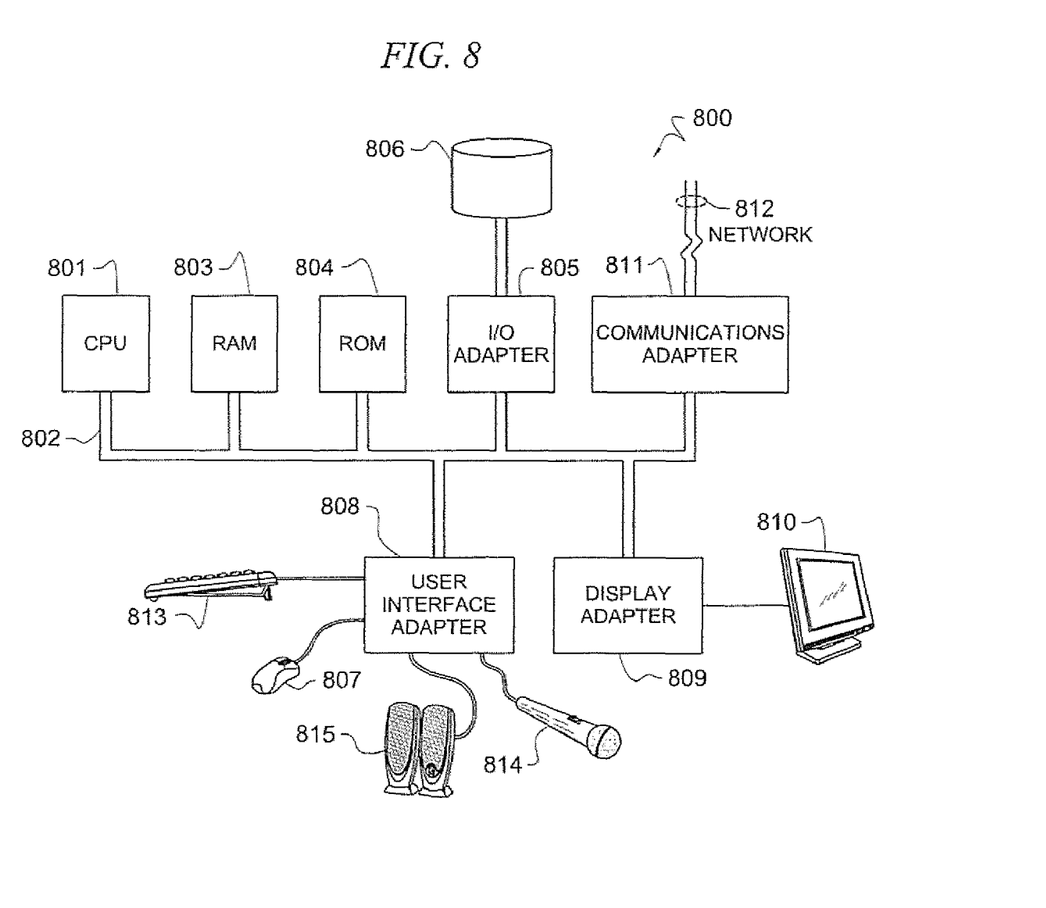
FIG. 8 illustrates an exemplary computer system adapted according to embodiments of the present invention.

FIG. 8 illustrates exemplary computer system 800 adapted according to embodiments of the present invention. That is, computer system 800 comprises an example system on which embodiments of the present invention may be implemented (e.g., such as a computer used by a developer in creating a telephony application, a computer used by the service provider to execute a SIP application server and programs for a SOOF environment, a computer used to host and provide a third party application, a communication device used by a subscriber, and the like). Central processing unit (CPU) 801 is coupled to system bus 802. CPU 801 may be any general purpose CPU. However, the present invention is not restricted by the architecture of CPU 801 as long as CPU 801 supports the inventive operations as described herein. CPU 801 may execute the various logical instructions according to embodiments of the present invention to provide functionality, for example, as shown in the flows of FIGS. 5 and 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, including, for example, telephony application and other programs to provide the functionality described above.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as voice and video data, as with microphone 814 and a camera (not shown). In addition, it may allow for the output of data, as with speakers 815.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for applications. Communications adapter 811 is preferably adapted to couple computer system 800 to network 812 (for example, the Internet, a Local Area Network (LAN), Wide Area Network (WAN), Public Switched Telephone Network (PSTN), cellular network, and the like). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display the user interface of embodiments of the present invention.

It shall be appreciated that the present invention is not limited to the architecture of system 800. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of mater, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing service mediation, said system comprising:
   a service enablement platform between a service network and a telephony application external to said service enablement platform, said service enablement platform comprising:
      an adaptor providing an interface between said external telephony application and said service enablement platform, said adaptor exposing functionality of said external telephony application to one or more functional units of said service enablement platform,
      a first object layer providing an interface for said external telephony application to a logical telephony services unit that uses at least one service from said external telephony application in one or more logical telephony applications;
      a second object layer providing communications external to said service enablement platform; and
      a third object layer including said logical telephony services unit and a services bus.

2. The system of claim 1 further comprising:
   a services development environment in said service enablement platform to create additional services, said services development environment in communication with a logical telephony services unit that creates one or more logical telephony applications.

3. The system of claim 1, wherein said adaptor provides an interface between users of said service network and a plurality of applications available on said service enablement platform.

4. The system of claim 3 wherein said interface is a web services interface.

5. The system of claim 1 wherein said service network is a cellular network.

6. The system of claim 1 wherein said service network is an Internet Protocol (IP) service network.

7. The system of claim 1 wherein said adaptor is a functional unit running on a Session Initiation Protocol (SIP) application server.

8. A method for bridging users and telephony services, said method comprising:
   interfacing a service enablement platform between a communication network and at least one telephony service application that is external to said service enablement platform, said service enablement platform comprising:
      a first object layer providing an interface for said external telephony application to a logical telephony services unit that uses at least one service from said external telephony application in one or more logical telephony applications;
      a second object layer providing communications external to said service enablement platform; and
      a third object layer including said logical telephony services unit and a services bus; and
   exposing a service from said external telephony service application to one or more functional units in said service enablement platform via an adaptor.

9. The method of claim 8 wherein said exposing said service comprises:
   providing a common interface between said external telephony service application and said one or more functional units in said service enablement platform.

10. The method of claim 8 wherein said exposing a service includes presenting said service as a web service.

11. The method of claim 8 wherein said one or more functional units include one or more of: a logical telephony service combining unit; and a telephony services bus.

12. The method of claim 8 further comprising:
   interfacing a user session from said communication network with said service enablement platform;
   handing said communication session to said adaptor that communicates with said external telephony service application; and
   providing a requested service to said communication session from said external telephony service application.

13. The method of claim 8 further comprising:
   exposing an interface of said external telephony service application as a web service to an object layer includes a logical telephony service combining unit; and
   combining at least one service of said external telephony service application with another service from another telephony services application into a logical telephony services application.

14. The method of claim 8 further comprising:
   communicating with said external telephony service application using an application-centric functional unit inside said service enablement platform that is operable to use one or more protocols compatible with said external telephony service application; and
   communicating with said communication network using a network-centric functional unit inside said service enablement platform that is operable to use one or more protocols compatible with said communication network.

15. The method of claim 14 wherein said application-centric functional unit is in communication with a functional unit that exposes said service to receive information identifying said service, said method further comprising:
   communicating with said external telephony service application to receive said service.

16. A method for bridging users and services, wherein said users connect to a service enablement platform through a service network, said method comprising:
   at said service enablement platform, receiving a communication session from a user, said communication session requesting a service provided by a telephony service application that is external to said service enablement platform, said service enablement platform comprising:
      a first object layer providing an interface for said external telephony application to a logical telephony services unit that uses at least one service from said external telephony application in one or more logical telephony applications;
      a second object layer providing communications external to said service enablement platform; and
      a third object layer including said logical telephony services unit and a services bus;
   using a service bridge adaptor in said communication network, communicating with said external telephony service application and exposing said requested service to a logical services object layer that is operable to create a logical service from one or more other services; and providing said requested service in said communication session.

17. The method of claim 16 wherein providing said requested service comprises:

combining said requested service with another service from another telephony service application into said logical telephony services application.

18. The method of claim 16 further comprising:

exposing said requested service and said another service as web services to said logical services object layer.

19. A non-transitory computer program product having a computer readable medium having computer program logic recorded thereon for bridging users and telephony services, said computer program product comprising:

code, when executed by a computer, interfacing a service enablement platform between a communication network and at least one telephony service application that is external to said service enablement platform, said service enablement platform comprising:

a first object layer providing an interface for said external telephony application to a logical telephony services unit that uses at least one service from said external telephony application in one or more logical telephony applications;

a second object layer providing communications external to said service enablement platform; and a third object layer including said logical telephony services unit and a services bus;

code, when executed by a computer, exposing a service from said external telephony service application to one or more functional units in said service enablement platform;

code, when executed by a computer, receiving a communication session at said service enablement platform from a user of said communication network, said communication session requesting a service provided by said external telephony service application;

code, when executed by a computer, communicating with said external telephony service application and exposing said requested service to a logical services object layer of said service enablement platform that is operable to create a logical service from one or more other services; and code, when executed by a computer, providing said requested service in the form of said logical service to said user.

20. The computer program product of claim 19, wherein said code for communicating with said application is, when executed by a computer, a service bridge adaptor in said communication network.

21. The computer program product of claim 19 further comprising:

code, when executed by a computer, communicating with said external telephony service application using an application-centric functional unit inside said service enablement platform that is operable to use one or more protocols compatible with said external telephony service application; and code, when executed by a computer, communicating with said communication network using a network-centric functional unit inside said service enablement platform that is operable to use one or more protocols compatible with said communication network.

22. The computer program product of claim 19 wherein said service is exposed as a web service.

* * * * *